US010247137B2

(12) United States Patent
Stuart

(10) Patent No.: US 10,247,137 B2
(45) Date of Patent: Apr. 2, 2019

(54) THRUST REVERSER SYSTEM WITH TRANSLATING-ROTATING HINGE ASSEMBLY

(71) Applicant: General Electric Company, Schenectady, NY (US)

(72) Inventor: Alan Roy Stuart, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 539 days.

(21) Appl. No.: 14/908,557

(22) PCT Filed: Jul. 30, 2014

(86) PCT No.: PCT/US2014/048779
§ 371 (c)(1),
(2) Date: Jan. 29, 2016

(87) PCT Pub. No.: WO2015/017492
PCT Pub. Date: Feb. 5, 2015

(65) Prior Publication Data
US 2016/0169156 A1 Jun. 16, 2016

Related U.S. Application Data

(60) Provisional application No. 61/859,806, filed on Jul. 30, 2013.

(51) Int. Cl.
*F02K 1/72* (2006.01)
(52) U.S. Cl.
CPC ............ *F02K 1/72* (2013.01); *F05D 2250/42* (2013.01); *F05D 2250/70* (2013.01); *Y02T 50/672* (2013.01)
(58) Field of Classification Search
CPC ... F02K 1/72; F02K 1/62; F02K 1/625; F02K 1/80; F05D 2250/42; B64D 29/06; B64D 29/08
See application file for complete search history.

(56) References Cited

U.S. PATENT DOCUMENTS 5,806,302 A 9/1998 Cariola et al.
2010/0064660 A1* 3/2010 Vauchel ................ B64D 15/12
60/226.2
(Continued)

FOREIGN PATENT DOCUMENTS

CN 101529072 A 9/2009
CN 101535622 A 9/2009
(Continued)

OTHER PUBLICATIONS

Unofficial English Translation of Chinese Office Action issued in connection with corresponding CN Application No. 201480043131.6 dated Aug. 30, 2016.
(Continued)

*Primary Examiner* — Andrew H Nguyen
(74) *Attorney, Agent, or Firm* — General Electric Company; Pamela Kachur

(57) ABSTRACT

A thrust reverser system suitable for a high-bypass turbofan engine of a type having a nacelle. The thrust reverser system includes a transcowl having a stowed, deployed and open positions. A hinge assembly translationally and rotationally couples the transcowl to a fixed structure that does not translate when the transcowl is translated in the aft direction. The hinge assembly includes a first member connected to the transcowl for translation therewith, and a fixed second member that defines a channel in which a portion of the first member is slidably received. The first and second members are configured to enable the portion of the first member to translate within the slider channel in an aft direction corresponding to a translational movement of the transcowl, and to enable the portion of the first member to rotate within the channel corresponding to a pivotal movement of the transcowl.

19 Claims, 4 Drawing Sheets

(56) References Cited

U.S. PATENT DOCUMENTS

2010/0132332 A1    6/2010  Vauchel
2014/0234090 A1*   8/2014  Hurlin .................... B64D 29/06
                                                        415/182.1

FOREIGN PATENT DOCUMENTS

EP    0109219  A2    5/1984
FR    2980173  A1    3/2013

OTHER PUBLICATIONS

International Search Report and Written Opinion issued in connection with corresponding application No. PCT/US2014/048779 dated Nov. 18, 2014.

* cited by examiner

THRUST REVERSER SYSTEM WITH TRANSLATING-ROTATING HINGE ASSEMBLY

CROSS-REFERENCE TO RELATED APPLICATIONS

This is a national stage application under 35 U.S.C. § 371(c) of prior filed, co-pending PCT application serial number PCT/US2014/48779, filed on Jul. 30, 2014, which claims priority to U.S. Provisional Patent Application Ser. No. 61/859,806, titled "Thrust Reverser System with Translating-Rotating Hinge Assembly" filed Jul. 30, 2013, all of which is incorporated by reference herein.

BACKGROUND

Embodiments of the present invention relate to high-bypass gas turbine engines, and more particularly to thrust reverser systems utilized in high-bypass turbofan engines to provide thrust reversal by diverting air from a fan bypass duct.

FIG. 1 schematically represents a high-bypass turbofan engine 10 of a type known in the art. The engine 10 is schematically represented as including a nacelle 12 and a core engine (module) 14. A fan assembly 16 located in front of the core engine 14 includes a spinner nose 20 projecting forwardly from an array of fan blades 18. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 between the nacelle 12 and an inner core cowl 36 that surrounds the core engine 14, and exits the duct 30 through a fan exit nozzle 32. The nacelle 12 defines the radially outward boundary of the bypass duct 30, and the core cowl 36 defines the radially inward boundary of the bypass duct 30 as well as provides an aft core cowl transition surface to a primary exhaust nozzle 38 that extends aftward from the core engine 14.

The nacelle 12 is typically composed of three primary elements that define the external boundaries of the nacelle 12: an inlet assembly 12A, a fan cowl 12B interfacing with an engine fan case that surrounds the fan blades 18, and a thrust reverser system 12C located aft of the fan cowl 12B. The thrust reverser system 12C comprises three primary components: a translating cowl (transcowl) 34A mounted to the nacelle 12, a cascade 34B mounted within the nacelle 12, and blocker doors 34C. The lower and upper halves of FIG. 1 represent the thrust reverser system 12C stowed and deployed, respectively. The cascade 34B is typically a fixed or translating structure of the nacelle 12, whereas the transcowl 34A can be seen in the upper half of FIG. 1 as having been translated aft to expose the cascade 34B and deploy the blocker doors 34C into the duct 30 using a link arm 34D. Translation of the transcowl 34A can be provided with a slider track (not shown) oriented roughly parallel to the axis of the engine 10. The blocker doors 34C are adapted to be pivotally deployed from their stowed position radially inward from the cascade 34B (lower half of FIG. 1) to their deployed position (upper half of FIG. 1), creating a circumferential opening between the fan cowl 12B and transcowl 34A that exposes the cascade 34B and causes bypassed air flowing through the duct 30 to be diverted through the exposed cascade 34B and provide a thrust reversal effect.

While two blocker doors 34C are shown in FIG. 1, a plurality of blocker doors 34C are typically circumferentially spaced around the circumference of the nacelle 12.

In addition to being capable of translating aft to deploy a thrust reverser system, transcowls of the type represented in FIG. 1 are often configured to pivot radially outward from the engine to permit maintenance access to, for example, the core engine. A nonlimiting example of such a configuration is depicted in FIG. 2, which schematically represents a cross-section of a portion of the transcowl 34A taken perpendicular to the axis of the engine 10. The transcowl 34A is equipped with two or more hinges 40 (of which one is visible in FIG. 2) that are pivotably coupled to an edge of a hinge beam 42. The opposite edge of the hinge beam 42 is slidably connected to a slider track 44, which is represented in FIG. 2 as being fixed to or otherwise interconnected with an engine pylon 13, which itself can be considered a fixed structure of the nacelle 12. The hinge beam 42 enables the transcowl 34A to translate along the slider track 44 (into the plane of FIG. 2) between stowed and deployed (aft) positions of the transcowl 34A. The hinges 40 are aligned on an axis roughly parallel to the slider track 44, and pivotably connect the transcowl 34A to the hinge beam 42 to enable the transcowl 34A to rotate from its stowed position to an open position that permits maintenance access. While such an arrangement serves its intended purpose, thrust reverser systems that are capable of reducing weight, distributing load in and improved manner, and promoting compactness are desirable.

SUMMARY OF THE INVENTION

Embodiments of the present invention provide a thrust reverser system suitable for high-bypass turbofan engines of types used in aircraft. The thrust reverser system is particularly adapted for use in a gas turbine engine having a nacelle surrounding a bypass duct.

According to a first aspect of the invention, the thrust reverser system includes a transcowl having a stowed position, a deployed position, and an open position. The transcowl is adapted to translate from the stowed position to the deployed position in an aft direction of the gas turbine engine to define a circumferential opening within the nacelle. A hinge assembly couples the transcowl to a fixed structure that does not translate when the transcowl is translated in the aft direction. The hinge assembly includes first and second members coupled to each other. The first member is connected to the transcowl for translation therewith in the aft direction of the gas turbine engine, and the second member is connected to the fixed structure. The second member defines a channel in which a portion of the first member is slidably received. The first and second members are configured to enable the portion of the first member to translate within the channel in the aft direction of the gas turbine engine corresponding to a translational movement of the transcowl relative to the nacelle between the stowed and deployed positions of the transcowl. The first and second members are further configured to enable the portion of the first member to rotate within the channel corresponding to a pivotal movement of the transcowl relative to the nacelle between the stowed and open positions of the transcowl.

According to a second aspect of the invention, a thrust reverser system is installed on a gas turbine engine that has a core engine, a core cowl surrounding the core engine, a nacelle surrounding the core cowl and comprising a fan cowl, and a bypass duct defined by and between the nacelle and the core cowl. The thrust reverser system includes a transcowl translationally and rotationally mounted to the nacelle. The transcowl has a stowed position, a deployed position, and an open position. The transcowl is adapted to translate from the stowed position to the deployed position in an aft direction of the gas turbine engine and away from the fan cowl to define a circumferential opening therebetween. The thrust reverser system further includes a cascade exposed to the bypass duct when the transcowl is in the deployed position. A hinge assembly couples the transcowl to a fixed structure that does not translate when the transcowl is translated in the aft direction. The hinge assembly includes a hook member connected to the transcowl and a slider track connected to the fixed structure so as not to translate when the transcowl is translated in the aft direction. The slider track defines a slider channel in which a hook portion of the hook member is slidably received. The hook member and the slider track are configured to enable the hook portion to translate within the slider channel in the aft direction corresponding to a translational movement of the transcowl relative to the nacelle between the stowed and deployed positions of the transcowl. The hook member and the slider track are further configured to enable the hook portion to rotate within the slider channel corresponding to a pivotal movement of the transcowl relative to the nacelle between the stowed and open positions of the transcowl.

Other aspects of the invention include high-bypass gas turbofan engines equipped with a thrust reverser system having the elements and/or operation described above.

A technical effect of embodiments of present the invention is the ability to provide two different motions of a transcowl, namely, translational and pivotal, through the use of a hinge assembly that enables both deployment of a thrust reverser system and maintenance access to other components of a gas turbine engine in which the thrust reverser system is installed. Aspects of such an arrangement include the ability to reduce the weight and space occupied by a thrust reverser system and its components.

Other aspects and advantages of this invention will be better appreciated from the following detailed description.

DETAILED DESCRIPTION

Figure 1:
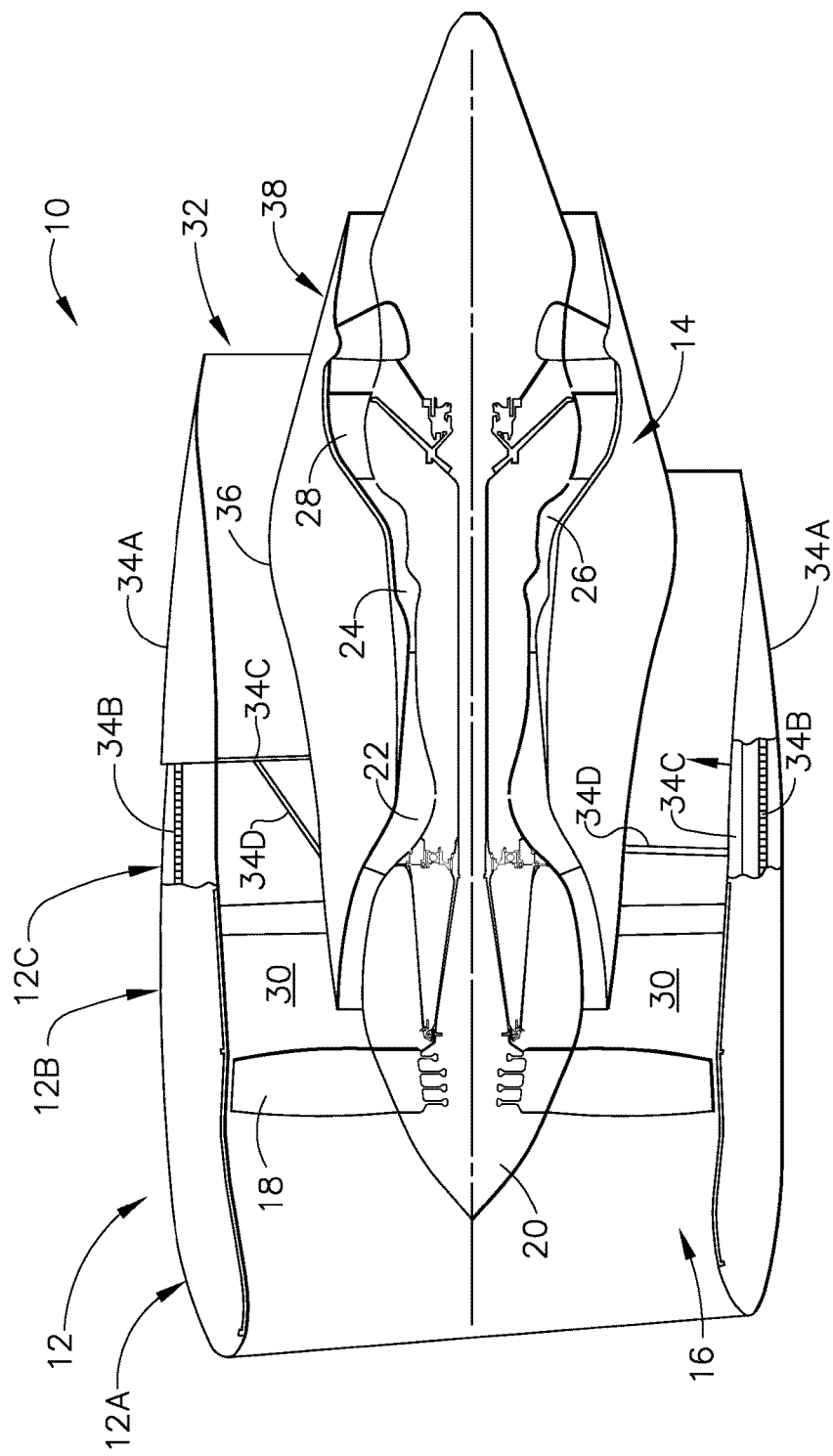
FIG. 1 schematically represents an axial (side) sectional view of a high-bypass turbofan engine, and schematically represents a thrust reverser system in stowed and fully deployed positions in the lower and upper halves of the view, respectively.
Figure 2:
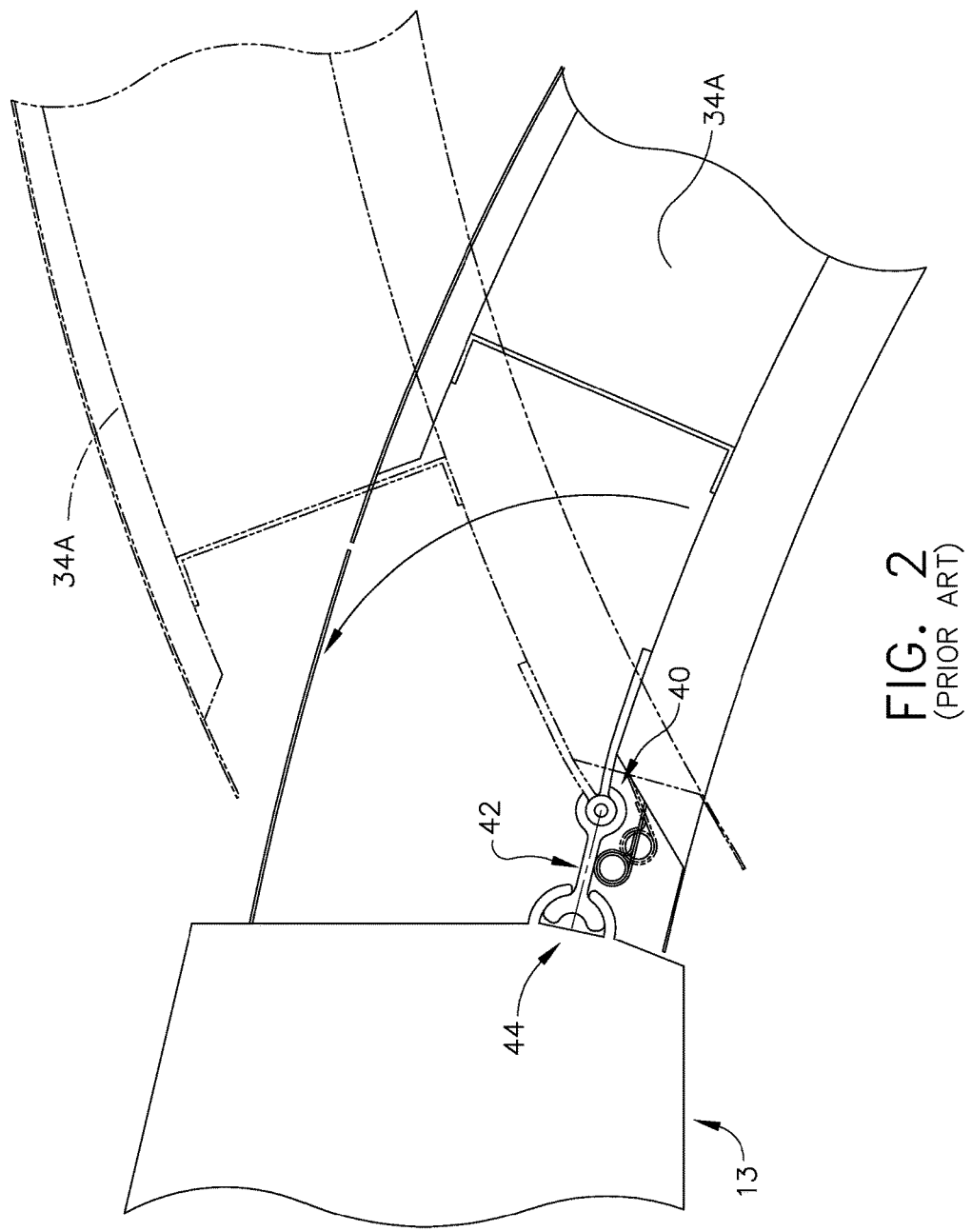
FIG. 2 schematically represents a cross-sectional view of a portion of a transcowl that is adapted for translational and rotational movement in accordance with a known configuration in the prior art.
Figure 3:
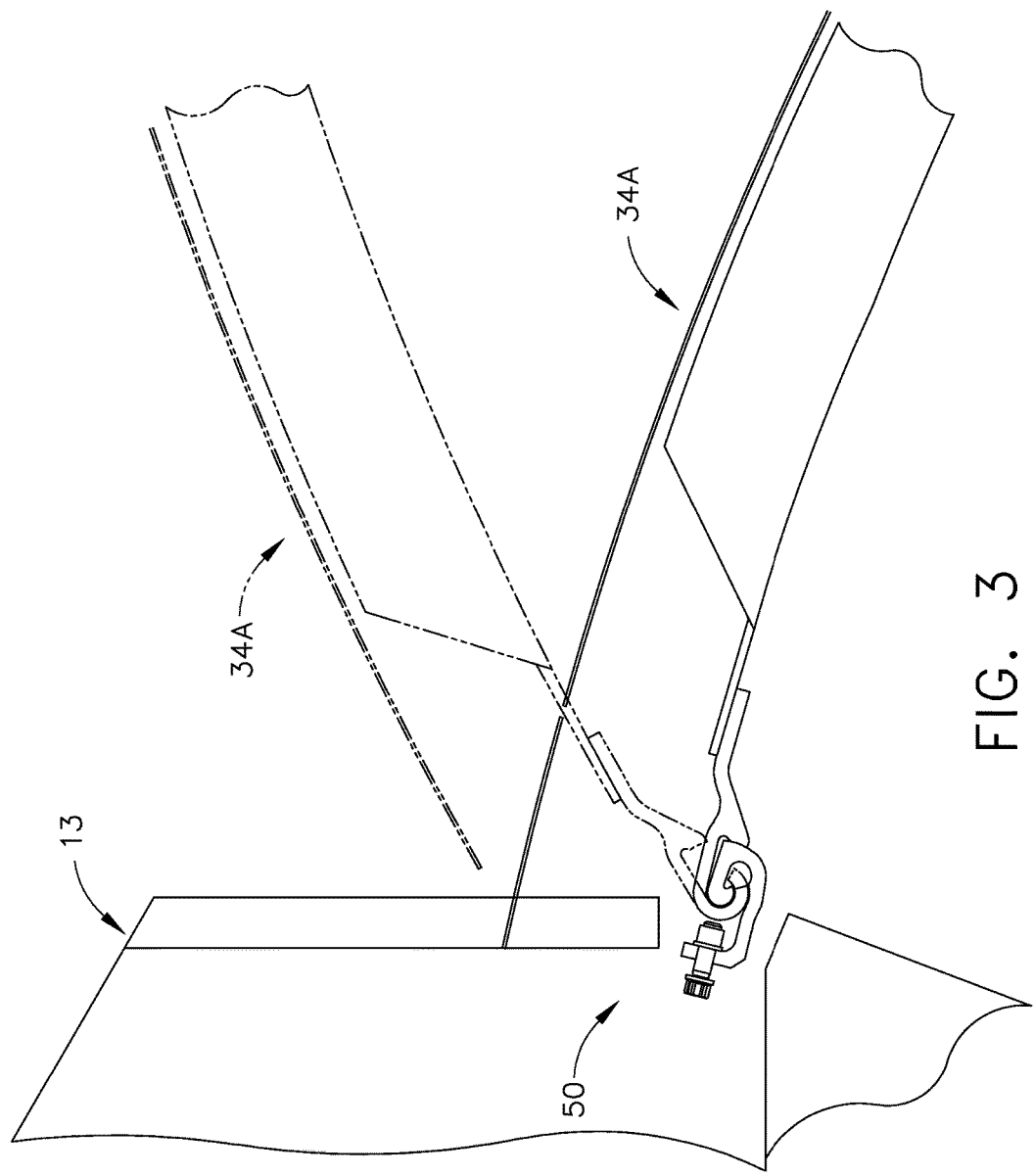
FIG. 3 schematically represents a cross-sectional view of a portion of a transcowl that is adapted for translational and rotational movement in accordance with a nonlimiting embodiment of the present invention.
Figure 4:
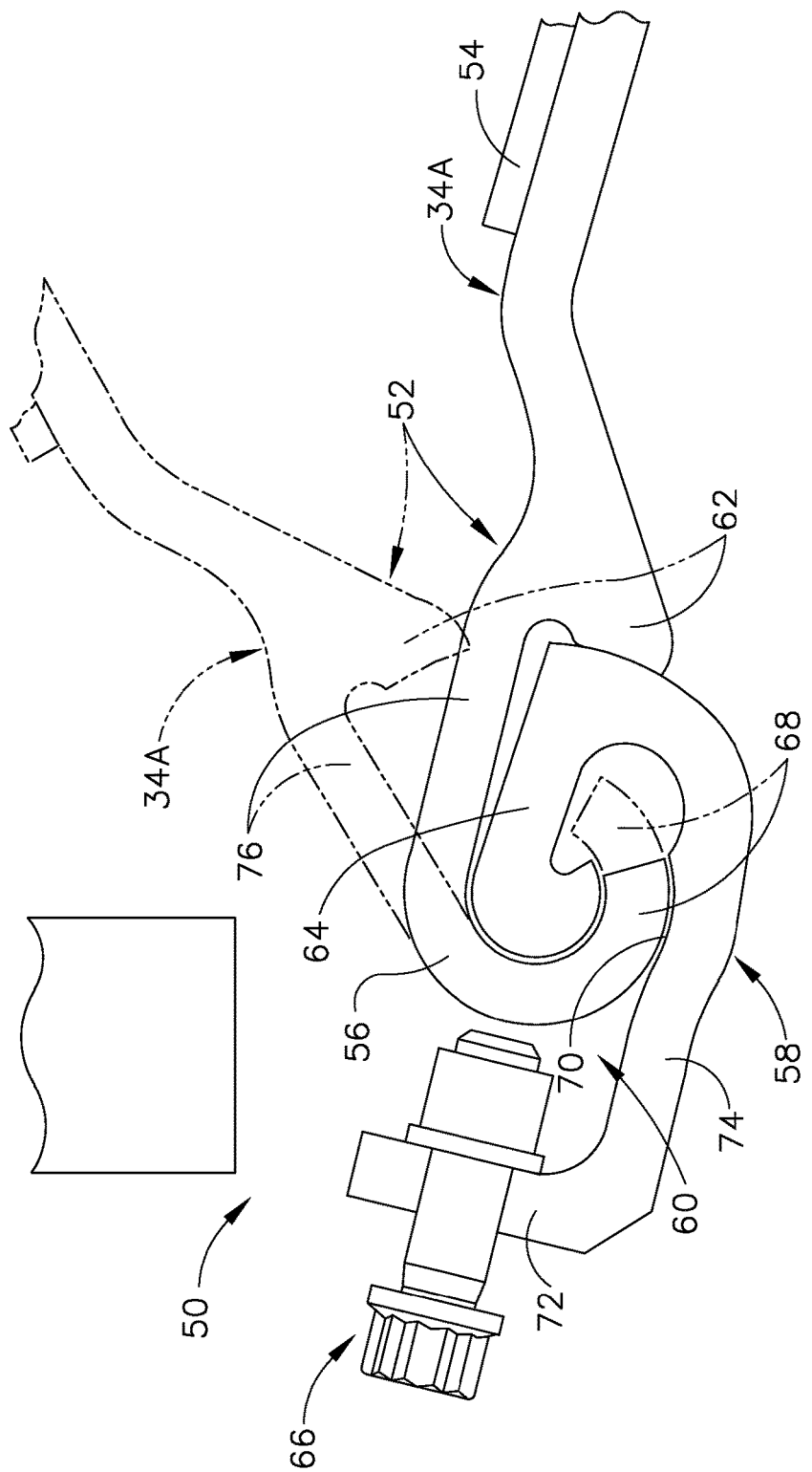
FIG. 4 schematically represents a detail showing a hinge assembly that provides a combined translational and rotational connection for the transcowl of FIG. 3.

FIGS. 3 and 4 schematically represent cross-sectional views of a portion of a transcowl (translating cowl) taken approximately perpendicular to the axis of a high-bypass gas turbine (turbofan) engine in accordance with a nonlimiting embodiment of the invention. As a matter of convenience, the transcowl and other components represented in FIGS. 3 and 4 will be described in reference to the engine 10 and other components represented in FIG. 1. As such, the transcowl of FIGS. 3 and 4 will be identified with reference number 34A, discussed as part of the thrust reverser system 12C located within the nacelle 12 of the engine 10 aft of a fan cowl 12B, and described as adapted for translation in an aft direction from the fan cowl 12B to define a circumferential opening therebetween through which cascades 34B are exposed to the bypass duct 30. It should be further understood that the core engine 14 is separated from the transcowl 34A by the bypass duct 30 and that, by configuring the transcowl 34A to pivot radially outward from the nacelle 12, access to the bypass duct 30 and/or core engine 14 can be gained. Other structural and functional aspects of the transcowl 34A can be understood from the preceding discussion of FIG. 1, and therefore will not be repeated here.

As indicated above, the transcowl 34A of FIGS. 3 and 4 is desired to have both a translational and rotational movement capability. Specifically, in addition to being capable of translating aft to deploy the thrust reverser system 12C, the transcowl 34A of FIGS. 3 and 4 is also configured to pivot radially outward from the nacelle 12 to permit maintenance access to, for example, the core engine 14. For this purpose, the transcowl 34A is represented in FIGS. 3 and 4 as equipped with a hinge assembly 50 adapted to provide means by which the transcowl 34A is able to translate and pivot relative to the nacelle 12 and an engine pylon 13. The hinge assembly 50 includes at least two members, first member 52 also referred to as a hook member and second member 58 also referred to as a slider track (FIG. 4) that are coupled together in a manner that enables a portion 56 of a first member 52 of the members 52 and 58 to translate within a portion 60 of a second member 58 of the members 52 and 58 in the aft direction of the engine 10, corresponding to a translational movement of the transcowl 34A relative to the nacelle 12 between stowed and deployed positions of the transcowl 34A. In addition, the members 52 and 58 are coupled together to enable the portion 56 of the first member 52 to rotate within the portion 60 of the second member 58, corresponding to a pivotal movement of the transcowl 34A relative to the nacelle 12 between the stowed and open positions of the transcowl 34A.

In describing the embodiment of FIGS. 3 and 4, the above-noted first and second members 52 and 58 will be referred to as a hook member 52 and a slider track 58, respectively, with the former having a hook 56 slidably disposed in a slider channel 60 defined by and within the latter for translational and rotational movement therein. The hook member 52 is connected to or otherwise extends from an edge 54 of the transcowl 34A, whereas the slider track 58 is a fixed structure, for example, connected to the pylon 13 (FIG. 3), such that the slider track 58 does not translate or rotate during deployment of the thrust reverser system 12C. Sliding of the hook 56 within the slider channel 60 in directions into and out of the plane of FIGS. 3 and 4 enables the transcowl 34A to translate between a stowed position and a deployed position, the latter exposing the cascades 34B to provide a thrust reversal effect as previously described with reference to FIG. 1. As is evident from FIGS. 3 and 4, rotation of the hook member 52 within the slider channel 60 enables the transcowl 34A to pivot in the plane of FIGS. 3 and 4, corresponding to a rotational movement between the stowed position and what will be termed herein an open position of the transcowl 34A that permits maintenance access to other components of the engine 10, for example, the core engine 14.

As represented in FIGS. 3 and 4, the hook member 52 is further configured to define a bearing wall 62 that slidably bears against an outer surface of the slider track 58 when the transcowl 34A is in its stowed and deployed positions and, as represented in FIG. 4, may slide free of the slider track 58 as the transcowl 34A is pivoted from its stowed position to its open position, as seen in FIG. 4. As is evident from FIG. 4, the hook 56 and bearing wall 62 cooperate to limit circumferential movement of the transcowl 34A relative to the pylon 13 while the transcowl 34A is in its stowed position, yet provides a translational connection to the slider track 58 to enable the transcowl 34A to translate along the slider track 58 (into and out of the planes of FIGS. 3 and 4). For this reason, the channel 60 may be linear and roughly parallel to the axis of the engine 10, in which case the hook 56 would be axially aligned within the channel 60 with hooks (not shown) of any other hook members associated with the transcowl 34A. FIG. 4 further represents the hinge assembly 50 as including attach bolts 66 (or other means) adapted to attach the assembly 50 to the pylon 13 (or some other suitable fixed structure). Alternatively, the hinge assembly 50 could be built into the pylon 13 or other suitable fixed structure (not shown).

As is evident from FIG. 4, the slider track 58 is configured to define an abutment wall 64 that is contacted by a distal end 68 of the hook 56 to establish a limit to which the hook 56 is able to rotate within the slider channel 60. As such, the hook 56 and abutment wall 64 cooperate to limit the extent to which the transcowl 34A can be pivoted relative to the cowl 12 as the transcowl 34A is pivoted from its stowed position to its open position. In the embodiment of FIGS. 3 and 4, the shape and geometry of the hook 56 and its location relative to the hinge bridge 74 allow the transcowl 34A to pivot up to about 45 degrees, though lesser and greater rotational angles are also within the scope of the invention. FIG. 4 further represents the slider track 58 as defining an arcuate depression 70 contacted by an outer surface of the hook 56, thereby assisting to stabilize the hook 56 within the slider channel 60 during pivotal movement of the transcowl 34A In addition to the abutment wall 64, the slider track 58 is represented in FIGS. 3 and 4 as comprising a flange 72 to which the bolts 66 (or similar mounting means) are fastened, and as further comprising a bridge 74 that can be seen in FIG. 4 as interconnecting portions of the track 58 that define the abutment wall 64 and flange 72. The hook member 52 can also be seen in FIG. 4 as having a bridge 76 that interconnects portions of the hook member 52 that define the hook 56 and bearing wall 62. The bridge 76 of the hook member 52 is represented as defining a clearance with the abutment wall 64 to avoid engagement with the abutment wall 64 when the transcowl 34A is in its stowed and/or deployed positions, thereby avoiding moment transfer and higher stress at the joint. Similarly, distal end 68 of hook 56 is represented as defining a clearance with the abutment wall 64 to avoid engagement with the abutment wall 64 when the transcowl 34A is in its open position, thereby also avoiding moment transfer and higher stress at the joint. This clearance also allows flexibility for build tolerance and/or alignment of the components.

With the arrangement described above, the weight of the thrust reverser system 12C may be minimized and/or the overall compactness of the system 12C promoted as a result of the hinge assembly 50 being adapted to provide both a translational and pivotal motion capability to the transcowl 34A. In particular, the thrust reverser system 12C lacks any intermediate component located between and coupling the fixed slider track 58 and the pivotable and translatable hook member 52. From the above discussion and depictions in FIGS. 3 and 4, it should be appreciated that the translational-rotational motion of the transcowl 34A is not dependent on any particular type of thrust reverser design, aside from the requirement that the system is capable of turning the air flow within the bypass duct 30 to generate a thrust-reversing effect. Furthermore, it should also be appreciated that the thrust reverser system 12C and its individual components (including the hinge assembly 50 and its individual components) can be constructed of various materials, including metallic, plastic and composite materials commonly used in aerospace applications and fabricated by machining, casting, molding, lamination, etc., and combinations thereof. Some examples of materials that could be utilitzed for constructing the thrust reverser system 12C and/or its individual components include aluminum, titanium, steel or graphite epoxy composite, as well as other materials with similar properties. Additionally, hinge assembly 50 may include a single continuous hook member 52 associated with a single continuous slider track 58. Alternatively, hinge assembly 50 may be comprised of one or more hook members 52 associated with one or more slider tracks 58. The use of a single continue hook member 52 associated with a single continuous slider track 58 acts to continuously distribute the load along the length of hinge assembly 50. Additionally, surfaces of hook member 52 that come into contact with surfaces of slider track 58 or surfaces of slider track 58 that come into contact with surfaces of hook member 52 may have a nylon lining or use of another suitable material to prevent wear.

The invention has been described in terms of various embodiments. It is apparent that other forms could be adopted by one skilled in the art. For example, the engine 10, the thrust reverser system 12C, and their components could differ in appearance and construction from what is shown in the figures, and the functions of each component of the hinge assembly 50 could be performed by components having different configurations from those shown if capable of achieving similar (though not necessarily equivalent) translational and pivotal movement of the transcowl 34A. Therefore, the scope of the invention is to be limited only by the following claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A thrust reverser system for a gas turbine engine having a nacelle surrounding a bypass duct, the thrust reverser system comprising:
    a transcowl having a stowed position, a deployed position, and an open position, the transcowl being adapted to translate from the stowed position to the deployed position in an aft direction of the gas turbine engine to define a circumferential opening within the nacelle; and
    a hinge assembly coupling the transcowl to a fixed structure that does not translate when the transcowl is translated in the aft direction, the hinge assembly comprising first and second members coupled to each other, the first member being connected to the transcowl for translation therewith in the aft direction of the gas turbine engine, the second member being connected to the fixed structure, the second member defining a channel in which a portion of the first member is slidably received, the first and second members being configured to enable the portion of the first member to translate within the channel in the aft direction of the gas turbine engine corresponding to a translational movement of the transcowl relative to the nacelle between the stowed and deployed positions of the transcowl, the first and second members being further configured to enable the portion of the first member to rotate within the channel corresponding to a pivotal movement of the transcowl relative to the nacelle between the stowed and open positions of the transcowl; and wherein the portion of the first member is a hook portion that is slidably received in the channel for translational and rotational movement therein.

2. The thrust reverser system according to claim 1, wherein the first member further comprises a bearing wall that engages an outer surface of the second member when the transcowl is in the stowed and deployed positions.

3. The thrust reverser system according to claim 2, wherein the bearing wall does not engage the outer surface of the second member when the transcowl is in the open position.

4. The thrust reverser system according to claim 1, wherein the second member further comprises an abutment wall and the portion of the first member defines a distal end of the first member that engages the abutment wall of the second member when the transcowl is in the open position.

5. The thrust reverser system according to claim 4, wherein the distal end of the first member and the abutment wall of the second member cooperate to limit the pivotal movement of the transcowl relative to the nacelle, and the first member defines a clearance with the abutment wall to avoid engagement with the abutment wall when the transcowl is in the stowed and deployed positions.

6. The thrust reverser system according to claim 1, wherein the channel defines a depression that engages the portion of the first member when the transcowl is in the stowed, deployed, and open positions.

7. The thrust reverser system according to claim 1, wherein the fixed structure is an engine pylon.

8. The thrust reverser system according to claim 1, wherein the thrust reverser system lacks any intermediate component located between and coupling the first and second members together.

9. The thrust reverser system according to claim 1, further comprising a cascade that is exposed to the bypass duct when the transcowl is translated to the deployed position.

10. The thrust reverser system according to claim 1, wherein the thrust reverser system is installed on the gas turbine engine.

11. A thrust reverser system installed on a gas turbine engine having a core engine, a core cowl surrounding the core engine, a nacelle surrounding the core cowl and comprising a fan cowl, and a bypass duct defined by and between the nacelle and the core cowl, the thrust reverser system comprising:

a transcowl translationally and rotationally mounted to the nacelle, the transcowl having a stowed position, a deployed position, and an open position, the transcowl being adapted to translate from the stowed position to the deployed position in an aft direction of the gas turbine engine and away from the fan cowl to define a circumferential opening therebetween;

a cascade exposed to the bypass duct when the transcowl is in the deployed position;

a hinge assembly coupling the transcowl to a fixed structure that does not translate when the transcowl is translated in the aft direction, the hinge assembly comprising a hook member and a slider track, the hook member being connected to the transcowl, the slider track being connected to the fixed structure so as not to translate when the transcowl is translated in the aft direction, the slider track defining a slider channel in which a hook portion of the hook member is slidably received, the hook member and the slider track being configured to enable the hook portion to translate within the slider channel in the aft direction corresponding to a translational movement of the transcowl relative to the nacelle between the stowed and deployed positions of the transcowl, the hook member and the slider track being further configured to enable the hook portion to rotate within the slider channel corresponding to a pivotal movement of the transcowl relative to the nacelle between the stowed and open positions of the transcowl.

12. The thrust reverser system according to claim 11, wherein the hook member further comprises a bearing wall that engages an outer surface of the slider track when the transcowl is in the stowed and deployed positions.

13. The thrust reverser system according to claim 12, wherein the bearing wall does not engage the outer surface of the slider track when the transcowl is in the open position.

14. The thrust reverser system according to claim 11, wherein the slider track further comprises an abutment wall and the hook portion defines a distal end that engages the abutment wall of the slider track when the transcowl is in the open position.

15. The thrust reverser system according to claim 14, wherein the abutment wall and the distal end of the hook portion cooperate to limit the pivotal movement of the transcowl relative to the nacelle.

16. The thrust reverser system according to claim 11, wherein the slider channel defines a depression that engages the hook portion when the transcowl is in the stowed, deployed, and open positions.

17. The thrust reverser system according to claim 11, wherein the fixed structure is an engine pylon.

18. The thrust reverser system according to claim 11, wherein the thrust reverser system lacks any intermediate component located between and coupling the slider track and the hook member together.

19. A high-bypass gas turbofan engine comprising the thrust reverser system of claim 11.

* * * * *